H. RIES.
Grain Thrasher,
No. 106,622. Patented Aug. 23, 1870.
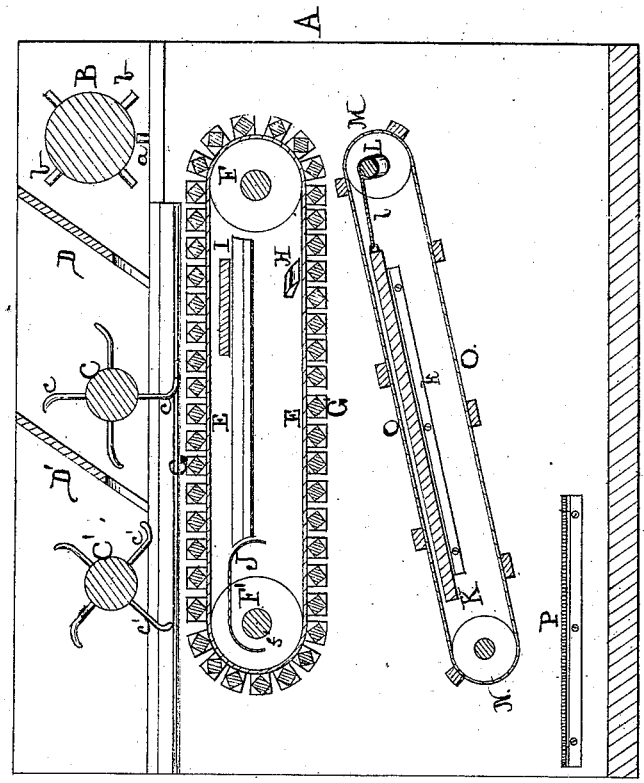
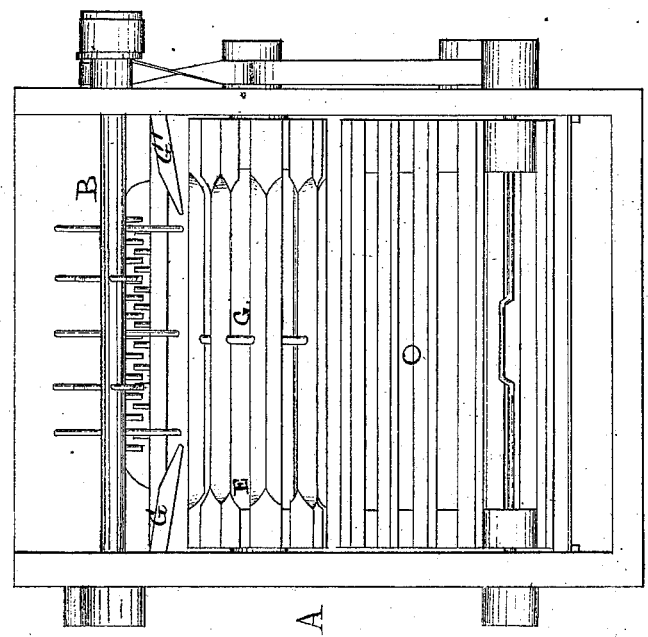

United States Patent Office.

HENRY RIES, OF NORWALK, OHIO.

Letters Patent No. 106,622, dated August 23, 1870.

IMPROVEMENT IN GRAIN-THRASHER, &c.

The Schedule referred to in these Letters Patent and making part of the same

*To all whom it may concern:*

Be it known that I, HENRY RIES, of Norwalk, in the county of Huron and State of Ohio, have invented new and useful Improvements in Grain-Thrashers, Separators, and Cleaners; and I do hereby declare the following to be a full and correct description of the same, sufficient to enable others skilled in the class to which my invention appertains to fully understand and construct the same, reference being had to the accompanying drawing which makes part of this specification, and in which—

Figure 1 is an end view of my improved machine, and

Figure 2 is a longitudinal vertical section of the same in line $x\ x$, fig. 1.

Like letters of reference indicate like parts in both figures.

The nature of my invention consists—

First, in the arrangement of a bottomless apron in such a manner above the shaking delivery-board that the grain falls through between the slats of the apron, and is equally distributed over the shaking-board nearly the entire length of the same.

Second, in the arrangement of certain slats which prevent the grain, after being thrashed, from falling on the belts of the apron.

Third, in the arrangement of shafts provided with beater-arms, and of a shield over the rear end roller of the bottomless apron, which prevent the straw from winding around the shafts and pulleys.

Fourth, in the arrangement of cleaning-arms, suitably attached to the frame, which prevent any grain which may have fallen on the under part of the apron-belts from being carried by the latter to the pulleys, thus protecting both belts and pulleys from injury.

Fifth, in the arrangement of the endless apron, horizontally or level, for the purposes hereinafter described.

Sixth, in the arrangement and combination of the several parts of the machine.

A, in the drawing, represents the frame of my machine, between the sides of which, at one end, is arranged a thrashing-roller, B, being provided with the usual projections $b$ passing between teeth $a$ on the frame.

C C' are beater-shafts, provided with beater-arms $c$ $c'$, protected by inclined boards D D'.

Under these rollers and shafts an endless apron, E, which is bottomless, that is to say, under which is placed no other bottom than the shaker-board, is situated, consisting of a series of slats, secured at each end to belts which pass around pulleys F F'.

Extending over the width of these belts, on each side of the machine, and secured to the latter, are protecting-slats G, which prevent kernels of grain from falling on the belts, and thus being carried outside of the machine.

Similar slats, G', are placed over the under part of the apron, as shown in fig. 2.

Extending across the width of the belts, on the inside of their under part, and secured to the side of the machine, are cleaning-arms H, the belt passing directly under them. These arms brush off any kernels of grain falling on the belts, and prevent them from being carried under the pulleys which would soon be clogged without this protection.

I is a board extending across the machine, under the upper part of the belt, between the lines of the thrashing-roller B and the first beater-shaft C, which board serves to prevent any straw which may get in between the slats of the apron E, on passing over it from under the thrashing-roller B to the beater-shaft C, from falling through and down on the shaker-board, but forces it under the arms $c$ of the beater-shaft.

The shaft $f$ of the pulley F is protected against straw winding around it by means of a shield, J, secured to the sides of the machine, and bent over the shaft.

Under the endless apron E moves, on suitable slides $k$, the inclined shaker-board K, to which a reciprocating motion is imparted by means of a pitman, $l$, from a crank-shaft, L, carrying pulleys M, over which, and pulleys N, at the rear end of the machine, passes an endless apron, O, with slats set very far apart, which slats, passing over the shaker-board, push the grain from the same downward upon the sieve P.

This apron O is, however, only to be used when the shaker-board is made immovable by disconnecting the pitman $l$ from the crank-shaft L, for, when motion is imparted to the shaker-board, the grain will slide down from it by reason of such motion, without the additional pushing of the slats of apron O.

As will be seen, the endless apron E is arranged entirely horizontal or level. The device for carrying off the straw and chaff is always attached to the lower end at the rear of the machine; consequently the distance which the straw has to traverse in falling from said apron E unto the carrier device is very small, and as I intend to apply doors to the end of the machine, the wind cannot blow away and scatter the straw, as is now the case in many machines which have the endless apron inclined upwardly, and in which the straw has to fall a considerable distance to reach the carrying device.

The inclined boards D D' assist in protecting the beater-shafts C C', by preventing the straw from passing upwardly as it is carried along by the apron E.

Having thus described my invention,

What I claim as new, and desire to secure by Letters Patent, is—

1. The arrangement of the bottomless apron E with the shaker-board K, as herein shown, so that the grain falls through between its slats directly on the shaker-board, substantially as and for the purposes described.

2. The slats G G', arranged as described, to prevent grain from falling on the belts and injuring the pulleys, substantially as set forth.

3. The beater-shafts C C', with their arms c c', in combination with the inclined boards D D' and shield J, substantially as and for the purposes described.

4. The arms H, arranged on the sides of the machine as shown, substantially as and for the purposes described.

5. The arrangement of the endless apron E, horizontally or level, in contradistinction to an inclined position, in combination with the beater-shafts C C', all operating for the purpose substantially as set forth.

6. The combination and arrangement of the thrashing-roller B, teeth a, inclined boards D D', beater-shafts C C', endless apron E, slats G G', shield J, arms H, shaker-board K, and endless apron O, substantially as and for the purposes set forth.

HENRY RIES.

Witnesses:
JOHN WIEDERSHEIM,
W. H. FINCKEL.